United States Patent
Ravichandran

(10) Patent No.: US 10,447,741 B2
(45) Date of Patent: Oct. 15, 2019

(54) SERVER-MANAGED NOTIFICATIONS FOR MAINTAINING REGISTERED STATE

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 235 days.

(21) Appl. No.: 15/660,128

(22) Filed: Jul. 26, 2017

(65) Prior Publication Data

US 2019/0036985 A1    Jan. 31, 2019

(51) Int. Cl.
*G06F 15/16* (2006.01)
*H04L 29/06* (2006.01)

(52) U.S. Cl.
CPC ...... *H04L 65/1083* (2013.01); *H04L 65/1006* (2013.01); *H04L 65/1016* (2013.01); *H04L 65/1073* (2013.01)

(58) Field of Classification Search
CPC ............. H04L 65/1006; H04L 65/1016; H04L 65/1073
See application file for complete search history.

(56) References Cited

U.S. PATENT DOCUMENTS

| | | | | |
|---|---|---|---|---|
| 7,395,336 B1 * | 7/2008 | Santharam | ............ | H04W 60/06 709/227 |
| 7,694,127 B2 * | 4/2010 | Adams | .............. | H04L 29/06027 713/151 |
| 2006/0209900 A1 * | 9/2006 | Sekaran | ................... | H04L 67/10 370/503 |
| 2008/0108348 A1 * | 5/2008 | Kottilingal | ............ | H04W 28/18 455/435.1 |
| 2012/0214480 A1 * | 8/2012 | Ionescu | ............... | H04L 65/1073 455/425 |
| 2014/0258367 A1 * | 9/2014 | Suryavanshi | ....... | H04L 65/1073 709/203 |
| 2014/0258368 A1 * | 9/2014 | Suryavanshi | ..... | H04L 29/06047 709/203 |
| 2016/0344845 A1 * | 11/2016 | Shuman | ................... | H04L 67/18 |
| 2018/0198830 A1 * | 7/2018 | Wallis | ...................... | H04L 67/26 |
| 2019/0098103 A1 * | 3/2019 | El-Gawady | ........... | H04L 67/303 |

* cited by examiner

*Primary Examiner* — Douglas B Blair
(74) *Attorney, Agent, or Firm* — Lee & Hayes, P.C.

(57) ABSTRACT

Maintaining a registered state via server-managed notifications is described herein. In an example, server(s) can receive an indication from an application associated with a device, the indication can identify a response to a registration request sent by the application for registration with a service provider. Based at least partly on the indication, the server(s) can start a first timer associated with a first predetermined time interval after which the server(s) are to send a first notification to the application. The server(s) can determine, based at least in part on the first timer, a lapse of the first predetermined time interval and can send the first notification to the application. The first notification can cause the application to transition from an inactive state to an active state, and send a new registration request to register with the service provider to maintain a registered state.

20 Claims, 6 Drawing Sheets

SERVER-MANAGED NOTIFICATIONS FOR MAINTAINING REGISTERED STATE

BACKGROUND

Internet Protocol (IP) multimedia service providers can provide IP multimedia services to devices. IP Multimedia Subsystem (IMS) enables the delivery of voice communications and/or multimedia services over IP networks. IMS utilizes Session Initiation Protocol (SIP) for controlling multimedia communication sessions. In an example, SIP registration can be used prior to enabling IMS. SIP registration begins when a device (e.g., or an application running on the device) sends a SIP register to one or more servers (e.g., SIP server and/or IMS server). The SIP register notifies the one or more servers of the location (e.g., IP address) of the device. Upon receipt, the one or more servers can send a request for additional information (e.g., identification data). Upon receiving a response from the device, the one or more servers validate the device (if the response includes valid identification data) and register the device in a contact database associated with the one or more servers. Responsive to registering the device, the one or more servers send a response to the device indicating that the registration was successful. After the device is registered, the one or more servers can facilitate voice communications and/or multimedia services over IP until the registration expires.

To avoid losing access to voice communications and/or multimedia services over IP, devices need to stay registered with the one or more servers. Accordingly, devices are required to frequently send SIP registers to ensure persistent registration (and to avoid suspension of voice communications and/or multimedia services). In some examples, devices send SIP registers every thirty minutes, every hour, etc. to ensure persistent registration. However, sending SIP registers at such frequencies requires a significant amount of power and can drain the batteries of the devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
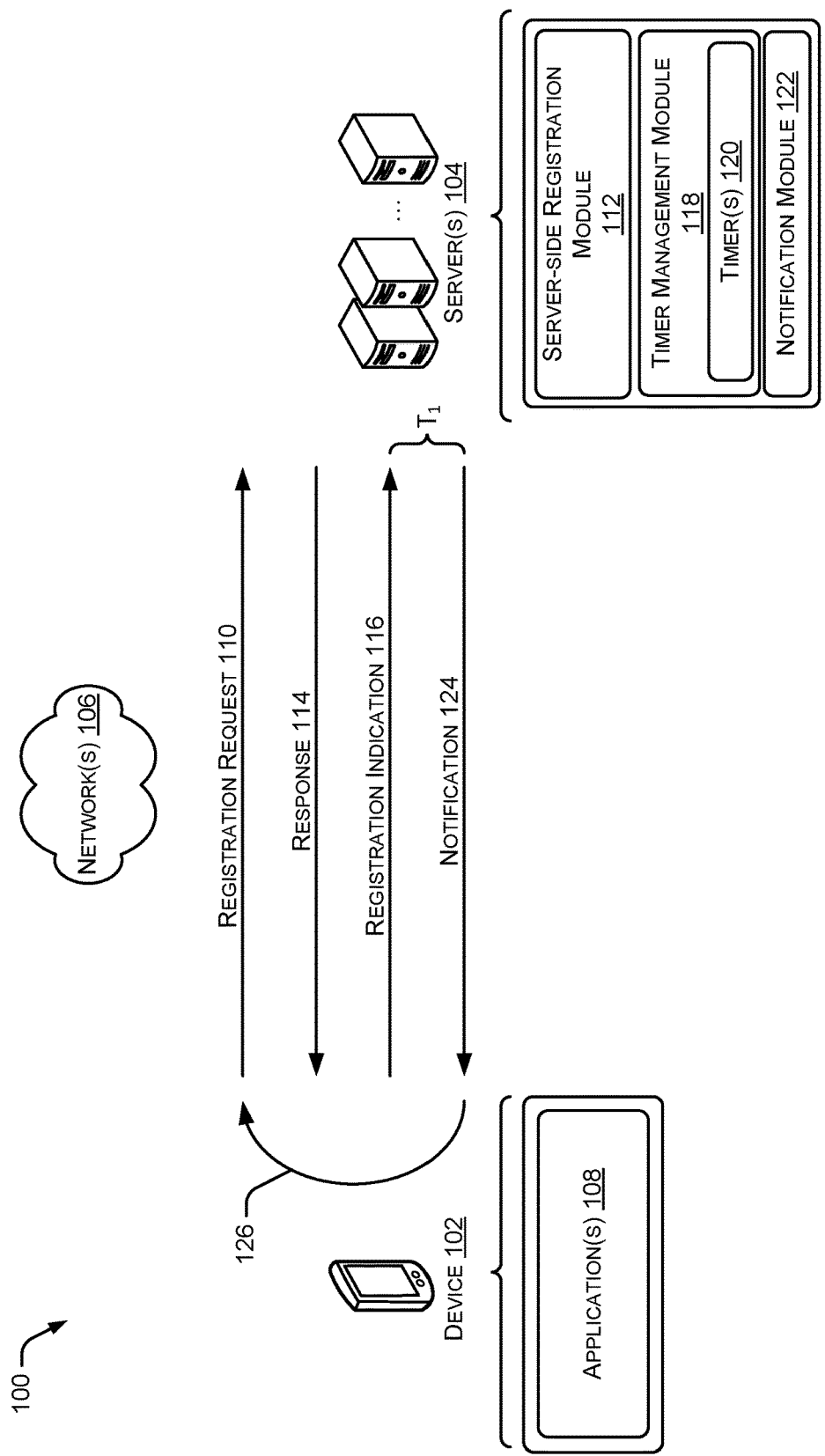
FIG. 1 illustrates an environment for maintaining a registered state via server-managed notifications.

In examples of the present disclosure, maintaining a registered state via server-managed notifications is described. As described above, Internet Protocol (IP) Multimedia Subsystem (IMS) enables the delivery of voice communications and/or multimedia services over IP networks. IMS utilizes Session Initiation Protocol (SIP) for controlling multimedia communication sessions. In an example, SIP registration can be used prior to enabling IMS. SIP registration begins when an application associated with providing IMS services sends a SIP register to one or more servers (e.g., SIP server and/or IMS server). The SIP register notifies the one or more servers of the location (e.g., IP address) of the device associated with the application. Upon receipt, the one or more servers can send a request for additional information (e.g., identification data). Upon receiving a response from the application, the one or more servers can validate the application (if the response includes valid identification data) and register the application in its contact database. Responsive to registering the application, the one or more servers can send a response to the application indicating that the registration was successful. After the application is registered, the one or more servers can facilitate voice communications and/or multimedia services over IP until the registration expires.

To avoid losing access to voice communications and/or multimedia services over IP, applications need to stay persistently registered with the one or more servers. Techniques described herein are directed to maintaining a registered state via server-managed notifications. In an example, an application associated with a device can attempt to register with the one or more servers as described above. If a registration is successful, the application can send an indication of a successful registration to the one or more servers. Responsive to receiving such an indication, the one or more servers can start a timer. The timer can be associated with a predetermined time interval after which the one or more servers are to send a notification (e.g., a push notification, etc.) to the application to instruct the application to send a new registration request. In an example, the predetermined time interval can be configurable. In at least one example, the one or more servers can send the notification to the application, causing the application to change to an active state (if it is not in an active state) and send a new registration request to the one or more servers. In some examples, the application can enter an inactive state shortly after it sends the new registration request. That is, techniques described herein leverage a periodic polling mechanism to enable an application to maintain a registered state and conserve the battery life of the device associated with the application.

Techniques described herein are also directed to managing local timers associated with the application. For instance, in at least one example, responsive to receiving an indication of a successful registration, the one or more servers can start an additional timer. The additional timer can be associated with a predetermined time interval after which the one or more servers are to send a notification (e.g., a push notification, etc.) to the application to instruct the application to query one or more local timers. The one or more local timers can be associated with retrieving updated data associated with the application. For instance, in an example, a local timer can be associated with updating data associated with a user profile or a local timer can be associated with checking for messages. In an example, the predetermined time interval associated with the additional timer can be configurable. In at least one example, the one or more servers can send the notification to the application, causing the application to query the one or more local timers.

Responsive to determining that a local timer of the one or more local timers is expired (e.g., a lapse of a predetermined time interval associated with the local timer), the application can send a request for updated data to a database storing the updated data. That is, responsive to determining that a local timer of the one or more local timers is expired, the application can retrieve updated data. In some examples, the application can return to the inactive state shortly after it retrieves the updated data. Such functionality enables the application to access updated data without the application having to be in an active state at all times. Furthermore, such functionality enables the server(s) to offload at least some data to a device, thereby enabling the server(s) to reduce the amount of storage required for storing data that is to be sent to one or more devices.

Additionally and/or alternatively, techniques described herein are directed to handling errors. In an example, an application associated with a device can attempt to register with the one or more servers, but the registration may be unsuccessful. That is, the registration can fail due to one or more errors. If a registration is not successful, an application can send an indication of a failed registration to the one or more servers. In some examples, the indication can include an error code identifying a reason for the failed registration. In at least one example, responsive to receiving an indication of an unsuccessful registration, the one or more servers can start an alternative timer. In at least one example, the alternative timer can correspond to a timer associated with a predetermined time interval after which the one or more servers are to send a notification (e.g., a push notification, etc.) to the application to instruct the application to send a new registration request. The predetermined time interval can be configurable, and can be based on a type of unsuccessful registration (as determined from the error code). That is, a length of the predetermined time interval can be based on whether an error is terminal or non-terminal. In some examples, the one or more servers can leverage the alternative timer to send subsequent notifications to the application until the one or more servers receive an indication of a successful registration or a timeout occurs.

As described above, techniques described herein are useful for enabling application(s) to maintain a registered state. By enabling application(s) to stay persistently registered with the one or more servers, the application(s) can reduce the risk of losing access to voice communications and/or multimedia services over IP. Furthermore, by reducing the frequency in which the application(s) send registration requests to the one or more server(s), techniques described herein limit the impact of persistent registration on the battery life of device(s) associated with the application(s). That is, by enabling the application(s) to enter an inactive state between registration requests, device(s) do not consume as much power, thereby extending the battery life of the device(s) associated with the application(s). Furthermore, as described herein, techniques enable application(s) to retrieve updated data that is temporarily stored on the one or more server(s) and store the updated data on the respective device(s). Accordingly, techniques described herein can reduce storage requirements associated with server(s).

FIG. 1 illustrates an environment 100 for maintaining a registered state via server-managed notifications. In FIG. 1, a device 102 communicates with one or more servers 104 via one or more networks 106. In an example, the device 102 can be associated with one or more applications 108. The application(s) 108 can be created by programmers to perform specific functionalities on device(s). The application(s) 108 can perform specific functionalities on the device 102, such as, but not limited to utility, entertainment, and/or productivity functionalities. In some examples, the application(s) 108 can be built into the device 102 (e.g., telecommunication, text message, clock, camera, etc.), and in other examples, the application(s) 108 can be customized (e.g., games, news, transportation schedules, online shopping, online banking, etc.). In at least one example, a user can interact with the device 102 to activate one or more applications 108. Additionally, the user can interact with the one or more applications 108 to perform various functionalities.

To enable IMS services, an application of the application(s) 108 can send a registration request 110 to the server(s) 104. In at least one example, one or more of the server(s) 104 can correspond to a SIP server and/or an IMS server. The server(s) 104 can include a server-side registration module 112, which can be configured to register the application 108 with the server(s) 104. In some examples, the server-side registration module 112 can receive the registration request 110 and send a request for additional information (not illustrated in FIG. 1). The application 108 can respond to the request by providing identification data to the server(s) 104 (not illustrated in FIG. 1). In at least one example, upon receiving a response (including the identification data, for example), the server-side registration module 112 can validate the application 108 based on the identification data and register the application 108 in a contact database associated with the server(s) 104. That is, the server-side registration module 112 can add an IP address associated with the application 108 to a contact database based on a successful registration.

In at least one example, the server-side registration module 112 can send a response 114 to the application 108. The response 114 can indicate that the registration request 110 was successful. Based on receiving the response 114, the application 108 can send a registration indication 116 to the server(s) 104. The registration indication 116 can provide a status of the registration request 110 to the server(s) 104. That is, the registration indication 116 can provide an indication as to whether the registration request 110 was successful. In at least one example, the registration indication 116 can be an HTTP post that can request that the server(s) 104 accept data associated with the registration indication 116, for storage, etc. In at least one example, after the application 108 sends the registration indication 116, the application 108 can enter an inactive state.

The server(s) 104 can also include a timer management module 118 for managing one or more timers 120. Each timer of the one or more timers 120 can be associated with a predetermined time interval ($T_1$) after which the server(s) 104, via a notification module 122, can send a notification 124 to the application 108. The time interval ($T_1$) can be configurable. In at least one example, the timer management module 118 can analyze the registration indication 116 to determine which timer of the one or more timers 120 to utilize. In some examples, if the registration indication 116 indicates that the registration request 110 was successful, the timer management module 118 can start a first timer associated with a first predetermined time interval ($T_1$), after which the server(s) 104, via the notification module 122, can send a notification 124 to the application 108 to cause the application 108 to enter an active state (if it is not already in an active state) and send a new registration request to the server(s) 104. Arrow 126 illustrates a return to sending a registration request 110 to the server(s) 104. As a result of receiving the notification 124, the application 108 can enter an active state (if it is not already in an active state) and send a new registration request prior to expiration of the registration. Accordingly, the application 108 can refrain from losing access to voice communications and/or multimedia services by maintaining a registered state. Furthermore, by allowing the application 108 to enter an inactive state after sending the registration indication 116, techniques described herein enable battery conservation while maintaining persistent registration.

FIG. 1 is directed to but one example of the technologies described herein for maintaining a registered state via server-managed notifications. As will be described in additional detail below, in some examples, one or more of the timers 120 can be utilized for managing local timers associated with the application and/or for handling errors. In such examples, the timer management module 118 can utilize the registration indication 116 to determine which timer of the one or more timers 120 to start for managing local timers and/or handling errors. In at least one example, various timers of the one or more timers 120 can be associated with corresponding predetermined time intervals after which the notification module 122 can send a corresponding notification to the application 108. Additional details associated with managing local timers associated with the application 108 and/or for handling errors are described below.

Figure 2:
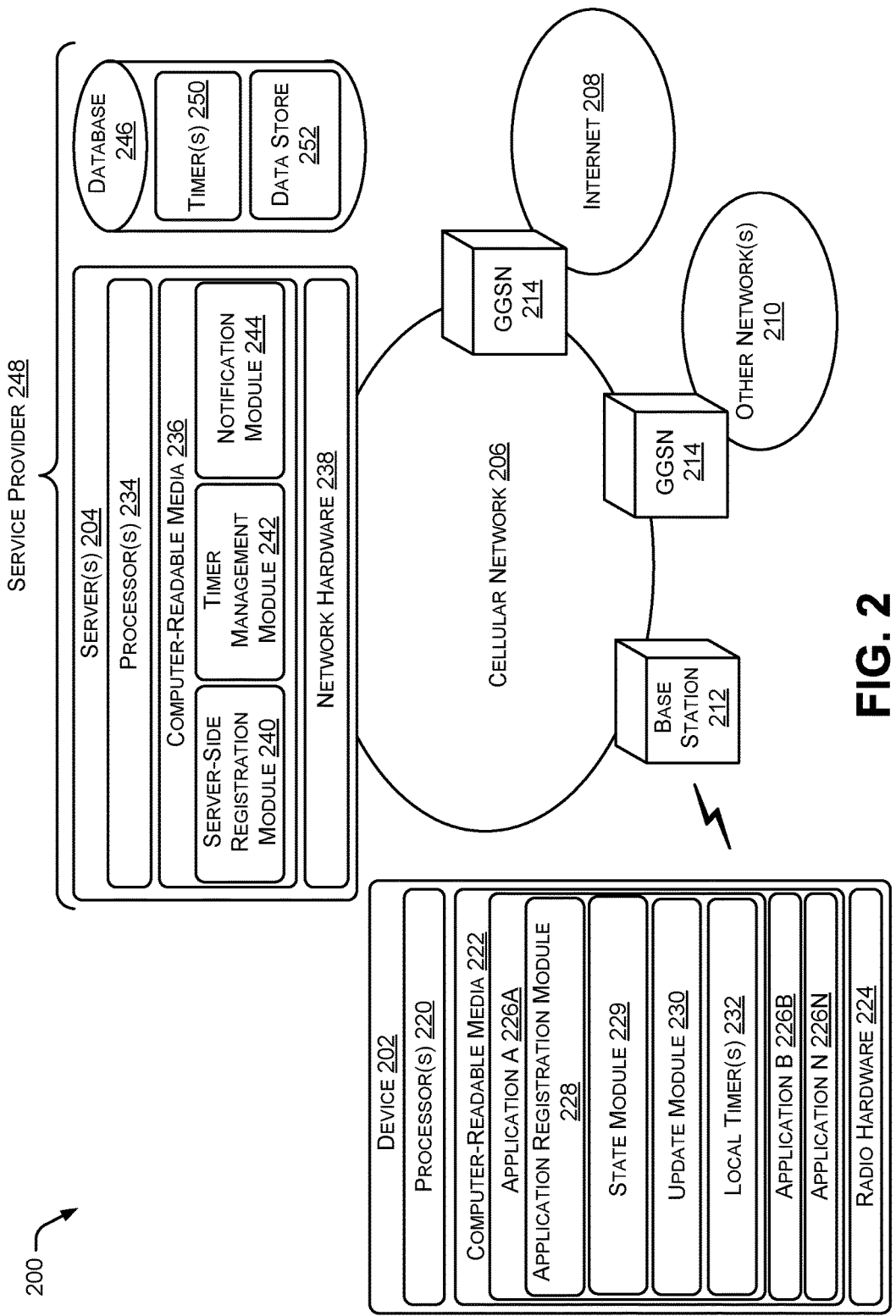
FIG. 2 illustrates an environment for maintaining a registered state via server-managed notifications.

FIG. 2 illustrates an environment 200 for maintaining a registered state via server-managed notifications.

As illustrated, environment 200 includes a device 202 communicatively coupled to server(s) 204 via a cellular network 206, the internet 208, and/or one or more other networks 210. In at least one example, the device 202 can correspond to the device 102, the server(s) 204 can correspond to the server(s) 104, and the cellular network 206, the internet 208, and/or the other network(s) 210 can correspond to the network(s) 106, as described above with reference to FIG. 1.

In some examples, device 202 can connect to the cellular network 206 via a corresponding base station 212. The cellular network 206 can be responsible for routing voice and/or data communication to other networks 210, as well as routing data communication to external packet switched networks, such as the internet 208. For example, the cellular network 206 can include a Gateway GPRS Support Node (GGSN) 214 and/or another equivalent node (e.g., packet data network gateway (PGW), etc.).

The device 202 can be any device including, but not limited to, a smart phone, a personal digital assistant, a netbook, a laptop computer, a smart appliance, and/or another electronic device that is capable of sending or receiving voice, video, and/or data via the cellular network 206, the internet 208, and/or one or more other network(s) 210 (e.g., a Wi-Fi network, a WIMAX network, another access network, etc.). The device 202 can include processor(s) 220, computer-readable media 222, and radio hardware 224. The processor(s) 220 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 220 can execute one or more modules and/or processes to cause the device 202 to perform a variety of functionalities, as set forth above and explained in further detail in the following disclosure. Additionally, each of the processor(s) 220 can possess its own local memory, which also can store program modules, program data, and/or one or more operating systems.

Depending on the exact configuration and type of the device 202, the computer-readable media 222, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 222 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 202. Any such non-transitory computer-readable media can be part of the device 202.

In contrast, communication media includes computer readable instructions, data structures, program modules, or other data in a modulated data signal, such as a carrier wave, or other transmission mechanism. As defined herein, computer storage media does not include communication media.

The computer-readable media 222 can include one or more applications (collectively, 226), which can be in the form of stand-alone applications, productivity applications, an operating system component, or any other application or software module. The application(s) 226 can correspond to the application(s) 108 as described above with reference to FIG. 1. The application(s) 226 can be created by programmers to perform specific functionalities on the device 202. The application(s) 226 can perform specific functionalities on the device 202, such as, but not limited to utility, entertainment, and/or productivity functionalities. In some examples, the application(s) 226 can be built into the device 202 (e.g., telecommunication, text message, clock, camera, etc.), and in other examples, the application(s) 226 can be customized (e.g., games, news, transportation schedules, online shopping, online banking, etc.). In at least one example, a user can interact with the device 202 to activate one or more of the applications 226. Additionally, the user can interact with one or more of the applications 226 to perform various functionalities. In at least one example, an application (e.g., Application A 226A) can be associated with providing IMS services.

In at least one example, the one or more applications 226 can be associated with one or more modules and data structures including, for example, an application registration module 228, a state module 229, and an update module 230, as illustrated with respect to Application A 226A. The one or more modules and data structures can be in the form of stand-alone applications, productivity applications, an operating system component, or any other application or software module configured to facilitate maintaining persistent registration status, as described herein. In at least one example, the one or more applications 226 can be associated with local timer(s), such as local timer(s) 232 associated with Application A 226A. While the application registration module 228, the state module 229, the update module 230, and the local timer(s) 232 are illustrated in association with Application A 226A, each of the application(s) 226 (e.g., application B 226B, application N 226N, etc.) can be associated with an application registration module, a state module, an update module, and/or one or more local timers.

The application registration module 228 can be configured to register the Application A 226A with the server(s) 204. In at least one example, the application registration module 228 can send a registration request to the server(s) 204. For instance, the application registration module 228 can send a SIP register to the server(s) 204. As described above, in some examples, the server(s) 204 can send a request for identification information from the application registration module 228. Responsive to receiving the request for identification information, the application registration module 228 can send identification information to the server(s) 204. As described herein, in at least one example, the server(s) 204 can authenticate the Application A 226A. In other examples, the server(s) 204 may not authenticate the Application A 226A and/or there can be an error that prohibits the server(s) 204 from registering the Application A 226A. In an example, the server(s) 204 can send a response to the application registration module 228. The response can indicate whether the registration request was successful or failed. In some examples, if the registration request failed, the response can include an error code identifying a reason for the failure.

The application registration module 228 can send an indication regarding a status of a registration request to the server(s) 204. That is, the indication can indicate the success or failure of the registration request to the server(s) 204. In at least one example, the indication can be an HTTP post request, however any other indication can be imagined. In at least one example, the indication can indicate that the registration request was successful. In at least one alternative example, the indication can indicate that the registration request was not successful. If the registration request was not successful (i.e., the registration request failed), the indication can include an error code (if available) to provide a reason for the failed registration request.

The state module 229 can be configured to manage states of the Application A 226A. In at least one example, the Application A 226A can be associated with an active state whereby the Application A 226A is in use and/or is otherwise running on the device 202. When the Application A 226A is in the active state, the Application A 226A is consuming power and therefore impacting the life of the battery. Alternatively, the Application A 226A can be associated with an inactive state whereby the Application A 226A is not in use and/or is otherwise not running on the device 202. When the Application A 226A is in the inactive state, the Application A 226A is not consuming power and therefore is not impacting the life of the battery.

In at least one example, based at least in part on the application registration module 228 sending the indication to the server(s) 204, the state module 229 can cause the Application A 226A to change from an active state to an inactive state. In additional and/or alternative examples, the state module 229 can cause the Application A 226A to change from an active state to an inactive state after determining an absence of interaction with the Application A 226A for more than a threshold period of time. Moreover, in some examples, the state module 229 can cause the Application A 226A to change from an active state to an inactive state responsive to an input from a user.

In some examples, the state module 229 can activate the Application A 226A. For instance, in at least one example, the state module 229 can receive a notification from the server(s) 204, described below, and the state module 229 can cause the Application A 226A to change from an inactive state to an active state (if it is not already in an active state). Further, in some examples, the state module 229 can cause the Application A 226A to change from an inactive state to an active state responsive to an input from a user.

The state module 229 can manage additional and/or alternative states of the Application A 226A. For instance, as described above, the Application A 226A can be associated with a registered state whereby the Application A 226A is permitted to receive voice communication and/or multimedia data (e.g., associated with IMS services). If the Application A 226A permits its registration to lapse, the Application A 226 can be associated with an unregistered state whereby the Application A 226A may not receive voice communication and/or multimedia data (e.g., associated with IMS services) until the Application A 226A re-registers with the server(s) 204.

The update module 230 can be configured to send request(s) for updated data associated with the Application A 226A. In at least one example, the Application A 226A can be associated with one or more local timers 232. Each local timer can be associated with a task (e.g., update user profile associated with the Application A 226A, check message(s) directed to the Application A 226A, etc.). Additionally, each local timer can be associated with a predetermined time interval after which the update module 230 is to send a request for updated data. In at least one example, the update module 230 can receive a notification from the server(s) 204 that can instruct the update module 230 to query the local timer(s) 232 to determine whether any of the local timer(s) 232 have expired (e.g., a corresponding predetermined time interval has lapsed). Based at least in part on determining that a local timer 232 has expired, the update module 230 can send a request for updated data. In at least one example, the update module 230 can send a request for updated data to the server(s) 204, as described below. The server(s) 204 can send updated data to the update module 230 and the update module 230 can update the Application A 226A based on the received updated data. For instance, in an example, based on retrieving updated data, the Application A 226A can update a user profile associated with the Application A 226A, update a message inbox with new message(s) intended for the Application A 226A, etc.

The radio hardware 224 provides wireless connectivity capabilities, such as connecting to the base station 212, a Wi-Fi network, or other wireless networks. The radio hardware 224 can include or be incorporated into processors, ASICs, programmable circuits such as FPGAs, or in other ways.

As described above, in at least one example, device 202 can connect to the cellular network 206 via a base station 212. A base station 212 can correspond to a fixed-location transceiver, which can also be called a cell site. As described above, some devices may not be capable of connecting to the cellular network 206 via a base station (e.g., base station 212). In such examples, a such devices can register with the cellular network 206 through the internet 208 using a unique identifier, such as an IMPI (IP multimedia private identity), an IMPU (IP multimedia public identity), a globally routable user agent URI (GRUU), or other. In at least one example, these identifiers can take the form of a telephone number.

As described above, the device 202 can communicate with the server(s) 204 via the cellular network 206, the internet 208, and/or the one or more other networks 210. Each of the server(s) 204 can be any type of server, such as a network-accessible server. In various examples, each of the server(s) 204 can be associated with one or more processors 234, computer-readable media 236, and network hardware 238. The processor(s) 234 can have the same and/or similar structure and/or function as the processor(s) 220, described above.

Depending on the exact configuration and type of the server(s) 204, the computer-readable media 236 can include computer storage media and/or communication media. The computer-readable media 236 can have the same and/or similar structure and/or function as the computer-readable media 222, described above. The computer-readable media 236 can include one or more modules and data structures including, for example, a server-side registration module 240, a timer management module 242, and a notification module 244. The one or more modules and data structures can be in the form of stand-alone applications, productivity applications, an operating system component, or any other application or software module for sending notifications to enable device(s) to maintain registered state(s), as described herein.

In at least one example, the server(s) 204 can be communicatively coupled with a database 246, as illustrated in FIG. 2. In alternative examples, the database 246 can be integrated with the server(s) 204. In either example, the server(s) 204 and the database 246 can be associated with a service provider 248. In at least one example, the service provider 248 can provision telecommunication services to the device 202. The database 246 can include timer(s) 250 and a data store 252. The timer(s) 250 are described below. The data store 252 can store data on behalf of one or more devices (e.g., device 202). In at least one example, the data store 252 can temporarily store data that is intended for the Application A 226A. In at least one example, the data store 252 can store data until the update module 230 sends a request to retrieve updated data from the server(s) 204 or until the data expires. In such an example, the data store 252 can store the data for a predetermined period of time and, if the data has not been retrieved by the update module 230, the data store 252 can delete any stale data (e.g., data that has been stored for more than the predetermined period of time).

The server-side registration module 240 can be configured to register devices, such as device 202, with the server(s) 204. As described above, the application registration module 228 can send a registration request to the server(s) 204. The server-side registration module 240 can receive the registration request and can send a request for identification information back to the application registration module 228. In at least one example, responsive to receiving valid identification information from the application registration module 228, the server-side registration module 240 can authenticate the Application A 226A and can send a response to the application registration module 228. The response can indicate that the registration request was successful. In at least one example, based on successfully registering the Application A 226A, the server-side registration module 240 can add an IP address associated with the Application A 226A to a contact database (not illustrated in FIG. 2). The IP address can be associated with an expiration (e.g., an interval of time after which the IP address expires), which can correspond to an expiration of the registration of the Application A 226A.

In some examples, the registration request can fail. For instance, the identification information may not be valid or an error disrupted the registration request and/or subsequent process. If the registration request failed (e.g., due to invalid identification information, an error, etc.), the server-side registration module 240 can send a response, which can include an error code identifying a reason for the failure.

The timer management module 242 can be configured to manage the one or more timers 250 associated with the server(s) 204. The timer(s) 250 can correspond to the timer(s) 120 described above with reference to FIG. 1. In some examples, the timer(s) 250 can be stored in a database 246, as illustrated in FIG. 2. In other examples, the timer(s) 250 can be stored in association with the timer management module 242 (as illustrated in FIG. 1). Each timer of the one or more timers 250 can be associated with a predetermined time interval after which the server(s) 204, via the notification module 244, can send a notification to the Application A 226A. The predetermined time intervals can be configurable.

In at least one example, a first timer of the timer(s) 250 can be associated with successful registrations. The first timer can be associated with a predetermined time interval after which the server(s) 204, via the notification module 244, can send a notification to the Application A 226A to enter an active state (if it is not already in an active state) and send a new registration request to the server(s) 204. In at least one example, a length of the predetermined time interval associated with the first timer can be shorter than a length of time associated with the validity of the registration. That is, the length of the predetermined time interval can be configured such that the notification module 244 is to send the notification prior to expiration of the registration.

A second timer of the timer(s) 250 can be associated with a predetermined time interval after which the server(s) 204, via the notification module 244, can send a notification to the Application A 226A to query one or more local timers 232. That is, the second timer can be associated with managing local timers. In at least one example, a length of the predetermined time interval associated with the second timer can be shorter than, the same as, or longer than the length of the predetermined time interval associated with the first timer. In at least one example, the timer management module 242 can activate the second timer responsive to receiving an indication of a successful registration. In such an example, the timer management module 242 can activate the second timer at a same time that the timer management module 242 activates the first timer.

A third timer and a fourth timer of the timer(s) 250 can be associated with error handling. In at least one example, the third timer can be associated with terminal errors and the fourth timer can be associated with non-terminal errors. In some examples, the timer management module 242 can analyze the indication regarding the status of the registration request (e.g., successful or unsuccessful) to determine whether to utilize the third timer or the fourth timer. In such examples, the timer management module 242 can look to the error code to determine whether an error is terminal or non-terminal. In at least one example, the third timer and the fourth timer can be associated with respective predetermined time intervals after which the server(s) 204, via the notification module 244, can send a notification to the Application A 226A to send a new registration request (e.g., attempt to re-register).

In some examples, the predetermined time interval associated with the third timer can be a same length as the predetermined time interval associated with the fourth timer. In other examples, the predetermined time interval associated with the third timer can be a different length as the predetermined time interval associated with the fourth timer. In at least one example, a length of the predetermined time interval associated with the third timer can be longer than a length of the predetermined time interval associated with the fourth timer. In some examples, a length of the predetermined time interval associated with the third timer and/or the predetermined time interval associated with the fourth timer can be associated with exponential backoff. For instance, in a series of subsequent predetermined time intervals, a first predetermined time interval can be two minutes, a second predetermined time interval can be four minutes, a third predetermined time interval can be eight minutes, and so on. In some examples, the lengths of the predetermined time intervals associated with the third timer and the fourth timer can be shorter than the length of the predetermined time interval associated with the first timer.

In at least one example, the timer management module 242 can analyze the indication regarding a status of the registration (e.g., successful or unsuccessful) to determine which timer to activate. In at least one example, the timer management module 242 can analyze the indication to determine whether the indication satisfies one or more other parameters (e.g., device identification, operating system type, client type, etc.). Based on the status of the registration, and in some examples satisfaction of the one or more other parameters, the timer management module 242 can determine which timer to activate. For instance, in some examples, if the indication indicates that the registration request was successful, the timer management module 242 can start the first timer. Additionally, based at least in part on receiving the indication indicating that the registration request was successful, the timer management module 242 can start the second timer. Alternatively, if the indication indicates the registration request was not successful, the timer management module 242 can determine whether the failure was associated with a terminal error or a non-terminal error (utilizing the error code). Depending on whether the failure was associated with a terminal error or a non-terminal error, the timer management module 242 can start the third timer (terminal) or the fourth timer (non-terminal).

While the timer(s) 250 described above are referred to as "first," "second," "third," and "fourth," such terms are used to differentiate between the timers and should not be construed as limiting in any way.

The notification module 244 can be configured to receive an indication from the timer management module 242 of a lapse of a predetermined time interval associated with a particular timer. The notification module 244 can send a notification to the device 202. In at least one example, the notification can correspond to a push notification, an update notification, or some other notification. The contents of the notification can vary depending on which timer is associated with the lapsed predetermined time interval. For instance, the notification module 244 can send a notification instructing the application registration module 228 to cause the Application A 226A to send a new registration request responsive to a lapse of the predetermined time interval associated with the first timer. Or, the notification module 244 can send a notification instructing the application registration module 228 to send a new registration request responsive to a lapse of the predetermined time interval associated with the third timer and/or fourth timer. Furthermore, the notification module 244 can send a notification instructing the update module 230 to query local timer(s) 232 responsive to a lapse of the predetermined time interval associated with the second timer. In some examples, the notification can instruct the state module 229 to cause the Application A 226A to enter an active state if the Application A 226A is not already in an active state.

It should be noted that the timer(s) 250 can include additional and/or alternative timers than those described above. Additionally and/or alternatively, the notification module 244 can send additional and/or alternative notifications than those described above. The aforementioned timer(s) and/or notification(s) are provided for illustrative purposes.

The network hardware 238 can provide wired or wireless networking capabilities to the server(s) 204. The network hardware 238 can include or be incorporated into processors, ASICs, programmable circuits such as FPGAs, or in other ways.

FIGS. 3-6 describe example processes for facilitating server-managed notifications. The example processes are described in the context of the environment of FIG. 2, but are not limited to that environment.

The processes described above in association with FIGS. 3-6 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

Figure 3:
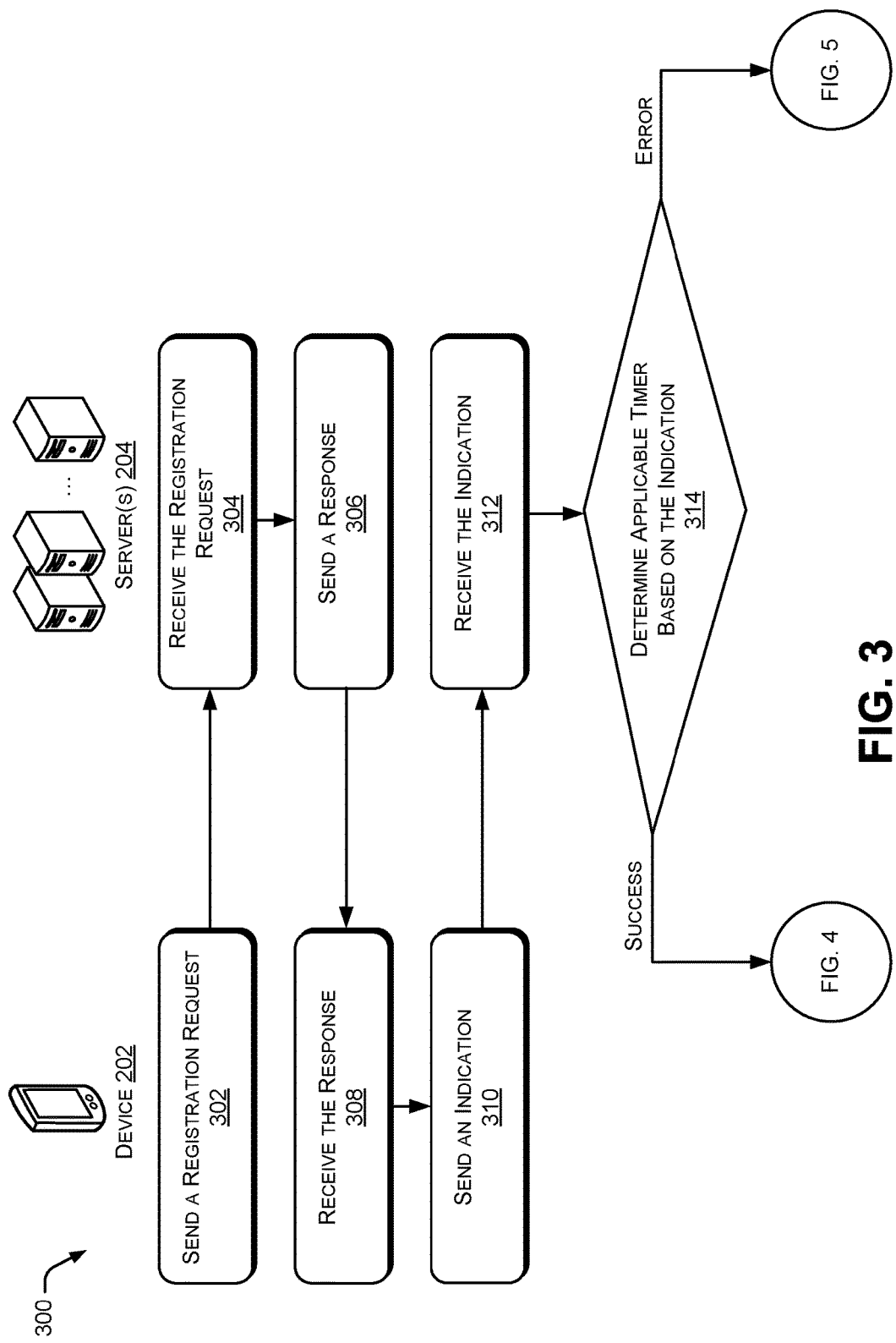
FIG. 3 illustrates an example process for initiating a registration with one or more servers.

FIG. 3 illustrates an example process 300 for initiating a registration with one or more servers.

Block 302 illustrates sending a registration request from the device 202 to the one or more servers 204. As described above, the application registration module 228 can be configured to register an Application A 226A associated with the device 202 with the server(s) 204. In at least one example, the application registration module 228 can send a registration request to the server-side registration module 240. For instance, the application registration module 228 can send a SIP register to the server-side registration module 240.

Block 304 illustrates receiving the registration request at the one or more servers 204. As described above, the server-side registration module 240 can receive the registration request. In some examples, the server-side registration module 240 can send a request for identification information back to the application registration module 228. Responsive to receiving valid identification information from the application registration module 228, the server-side registration module 240 can authenticate the Application A 226A. If the application registration module 228 does not provide identification information, or the identification information is not valid, the server-side registration module 240 can decline registration. In additional and/or alternative examples, one or more errors can cause a registration request to fail.

Block 306 illustrates sending a response from the one or more servers 204 to the device 202. As described herein, the server-side registration module 240 can send a response to the application registration module 228. The response can indicate whether the registration request was successful or failed. In some examples, if the registration request failed, the response can include an error code identifying a reason for the failure.

Block 308 illustrates receiving the response at the device 202. The application registration module 228 can receive the response from the server-side registration module 240.

Block 310 illustrates sending an indication from the device 102 to the one or more servers 204. The application registration module 228 can send an indication regarding a status of a registration request to the timer management module 242. That is, the indication can indicate the success or failure of the registration request to the timer management module 242. In at least one example, the indication can be an HTTP post request, however any other indication can be imagined. In at least one example, the indication can indicate that the registration request was successful. In at least one alternative example, the indication can indicate that the registration request was not successful. If the registration request was not successful (i.e., the registration request failed), the indication can include an error code (if available) to provide a reason for the failed registration request.

Block 312 illustrates receiving the indication at the one or more servers 204. The timer management module 242 can receive the indication from the application registration module 228.

Block 314 illustrates determining an applicable timer based on the indication. In at least one example, the timer management module 242 can analyze the indication regarding a status of the registration (e.g., successful or unsuccessful) to determine whether to activate a timer and/or which timer(s) to activate. In at least one example, the timer management module 242 can analyze the indication to determine whether the indication satisfies one or more other parameters (e.g., device identification, operating system type, client type, etc.). Based on the status of the registration, and in some examples satisfaction of the one or more other parameters, the timer management module 242 can determine whether to activate a timer and/or which timer(s) to activate. In at least one example, based at least in part on the indication indicating a successful registration, process 300 can proceed to process 400 described below with reference to FIG. 4. In at least one example, based at least in part on the indication indicating an unsuccessful registration (i.e., an error), process 300 can proceed to process 500 described below with reference to FIG. 5.

Figure 4:
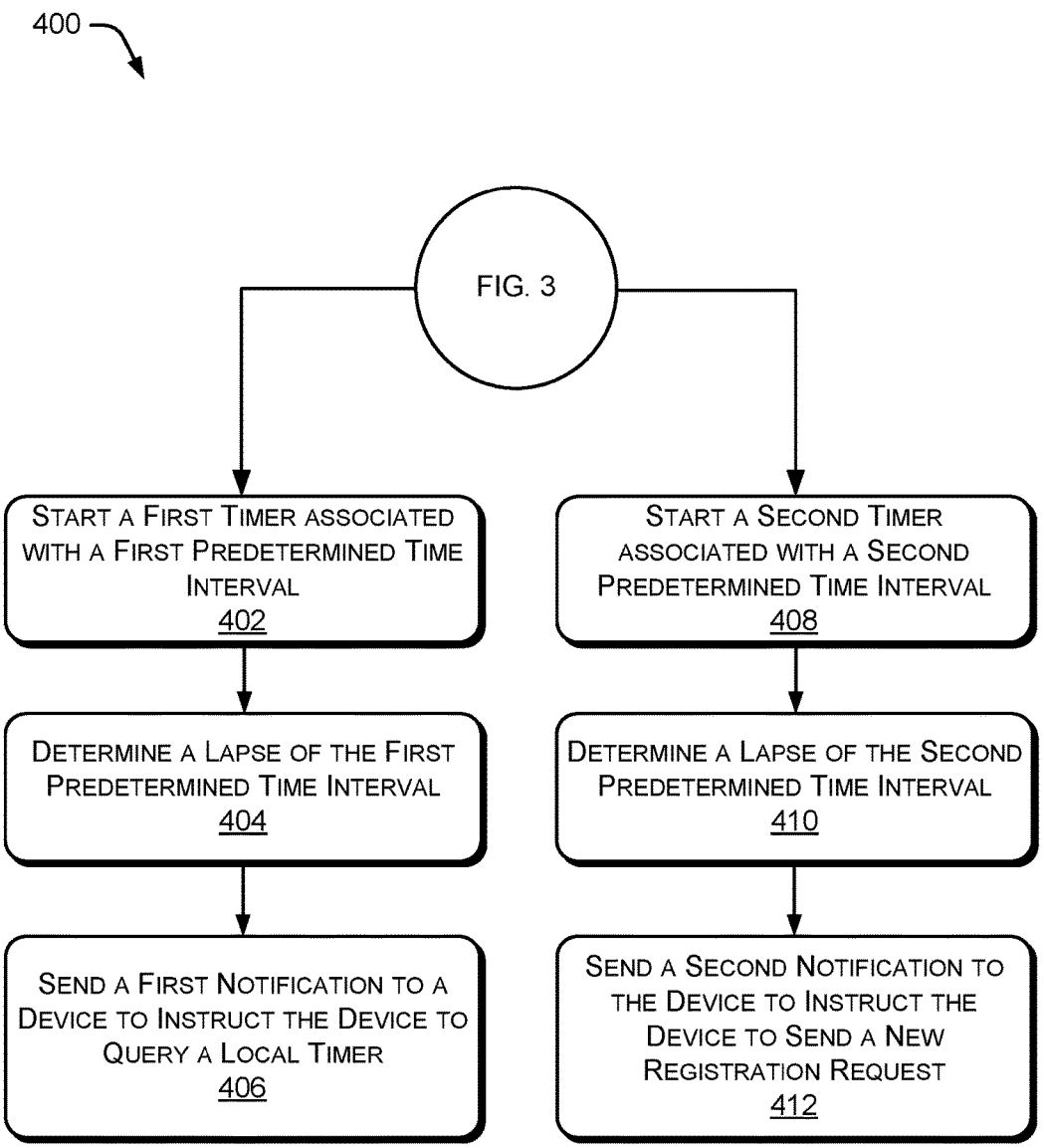
FIG. 4 illustrates an example process for maintaining a registered state via server-managed notifications.

FIG. 4 illustrates an example process 400 for maintaining a registered state via server-managed notifications, based on receiving an indication of a successful registration. As described above, based at least in part on an indication indicating a successful registration, the timer management module 242 can determine one or more timers to activate.

A timer of the timer(s) 250 can be associated with a predetermined time interval after which the server(s) 204, via the notification module 244, can send a notification to the Application A 226A to query one or more local timers 232. That is, a first timer can be associated with managing local timers.

Block 402 illustrates starting a first timer associated with a first predetermined time interval. In at least one example, the timer management module 242 can activate the first timer responsive to receiving an indication of a successful registration. Block 404 illustrates determining a lapse of the first predetermined time interval. In at least one example, the timer management module 242 can determine that an amount of time equal to the first predetermined time interval has lapsed and can send an indication to the notification module 244 to send a notification to the device 202. Block 406 illustrates sending a first notification to a device 202 to instruct the device 202 to query a local timer. In at least one example, responsive to receiving the first notification, the state module 229 can check the state of the Application A 226A. If the Application A 226A is not in an active state, the state module 229 can cause the Application A 226A to enter an active state. Once in the active state, the update module 230 can query one or more local timers 232, as described below with reference to FIG. 6.

As described above, in at least one example, another timer of the timer(s) 250 can be associated with successful registrations. For instance, a second timer can be associated with a predetermined time interval after which the server(s) 204, via the notification module 244, can send a notification to the Application A 226A to send a new registration request to the server(s) 204. In at least one example, a length of the predetermined time interval associated with the second timer can be shorter than a length of time associated with the validity of the registration.

Block 408 illustrates starting a second timer associated with a second predetermined time interval. In at least one example, the timer management module 242 can activate the second timer responsive to receiving an indication of a successful registration. In at least one example, the timer management module 242 can activate the second timer at a same time that the timer management module 242 activates the first timer. Block 410 illustrates determining a lapse of the second predetermined time interval. In at least one example, the timer management module 242 can determine that an amount of time equal to the second predetermined time interval has lapsed and can send an indication to the notification module 244 to send a notification to the device 202. Block 412 illustrates sending a second notification to the device 202 to instruct the device 202 to send a new registration request. In at least one example, responsive to receiving the second notification, the state module 229 can check the state of the Application A 226A. If the Application A 226A is not in an active state, the state module 229 can cause the Application A 226A to enter an active state. Once in the active state, the application registration module 228 can send a new registration request, as described above.

As described above, the timer management module 242 can be configured to manage the one or more timers 250 associated with the server(s) 204. Each timer of the one or more timers 250 can be associated with a predetermined time interval after which the server(s) 204, via the notification module 244, can send a notification to the Application A 226A. The predetermined time intervals can be configurable. In at least one example, the length of the predetermined time interval associated with the second timer can be configured such that the notification module 244 is to send the notification prior to expiration of the registration. In at least one example, a length of the predetermined time interval associated with the first timer can be shorter than, the same as, or longer than the length of the predetermined time interval associated with the second timer. In examples where the length of the predetermined time interval associated with the first timer is different than the length of the predetermined time interval associated with the second timer, the notification module 244 can send notification(s) to the device 202 to query local timer(s) at a different frequency than the notification module 244 send notification(s) to the device 202 to instruct the device 202 to send a new registration request.

Figure 5:
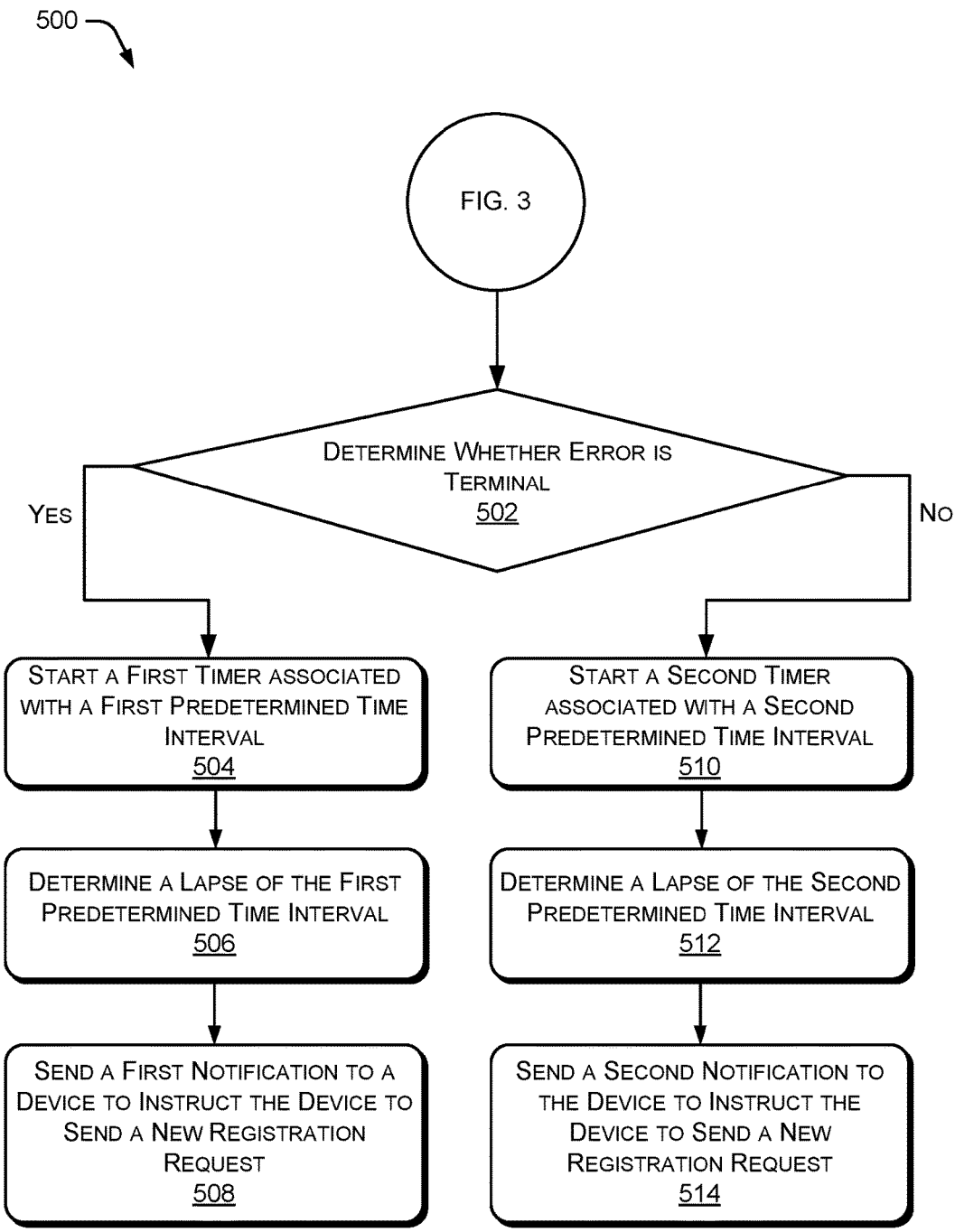
FIG. 5 illustrates an example process for error handling via server-managed notifications.

FIG. 5 illustrates an example process 500 for error handling via server-managed notifications. As described above, in at least one example, based at least in part on the indication indicating an unsuccessful registration (i.e., an error), process 300 can proceed to process 500.

As described above, one or more timers 250 (e.g., a first timer and a second timer) can be associated with error handling. In at least one example, the first timer can be associated with terminal errors and the second timer can be associated with non-terminal errors. In at least one example, the first timer and the second timer can be associated with respective predetermined time intervals after which the server(s) 204, via the notification module 244, can send a notification to the Application A 226A to send a new registration request (e.g., attempt to re-register).

Block 502 illustrates determining whether the error is terminal. In some examples, the timer management module 242 can analyze an indication regarding the status of the registration request (e.g., successful or unsuccessful) to determine whether to utilize a first timer or a second timer. In such examples, the timer management module 242 can look to the error code to determine whether an error is terminal or non-terminal.

Based at least in part on determining that the error is terminal, the timer management module 242 can start a first timer associated with a first predetermined time interval, as illustrated in block 504. In at least one example, the timer management module 242 can activate the first timer responsive to receiving an indication of a terminal error associated with a registration. Block 506 illustrates determining a lapse of the first predetermined time interval. In at least one example, the timer management module 242 can determine that an amount of time equal to the first predetermined time interval has lapsed and can send an indication to the notification module 244 to send a notification to the device 202. Block 508 illustrates sending a first notification to the device to instruct the device to send a new registration request. In at least one example, responsive to receiving the first notification, the state module 229 can check the state of the Application A 226A. If the Application A 226A is not in an active state, the state module 229 can cause the Application A 226A to enter an active state. Once in the active state, the application registration module 228 can send a new registration request, as described above.

Based at least in part on determining that the error is not terminal, the timer management module 242 can start a second timer associated with a second predetermined time interval, as illustrated in block 510. In at least one example, the timer management module 242 can activate the second timer responsive to receiving an indication of a non-terminal error associated with a registration. Block 512 illustrates determining a lapse of the second predetermined time interval. In at least one example, the timer management module 242 can determine that an amount of time equal to the second predetermined time interval has lapsed and can send an indication to the notification module 244 to send a notification to the device 202. Block 514 illustrates sending a second notification to the device to instruct the device to send a new registration request. In at least one example, responsive to receiving the second notification, the state module 229 can check the state of the Application A 226A. If the Application A 226A is not in an active state, the state module 229 can cause the Application A 226A to enter an active state. Once in the active state, the application registration module 228 can send a new registration request, as described above.

In some examples, the predetermined time interval associated with the first timer can be a same length as the predetermined time interval associated with the second timer. In other examples, the predetermined time interval associated with the first timer can be a different length as the predetermined time interval associated with the second timer. In at least one example, a length of the predetermined time interval associated with the first timer can be longer than a length of the predetermined time interval associated with the second timer. In some examples, a length of the predetermined time interval associated with the first timer and/or the predetermined time interval associated with the second timer can be associated with exponential backoff. For instance, in a series of subsequent predetermined time intervals, a first predetermined time interval can be two minutes, a second predetermined time interval can be four minutes, a third predetermined time interval can be eight minutes, and so on.

In at least one example, the application registration module 228 can send a new registration request (per the notification received from the notification module 244) and the new registration request can again be denied. In such an example, the application registration module 228 can send a new indication to the timer management module 242, which can indicate that the new registration request was denied. The timer management module 242 can determine which timer to activate and can activate either the first timer (terminal error) or the second timer (non-terminal error). In some examples, the timer management module 242 may not activate a timer but instead can provide an indication to a timer that is already running. The timer management module 242 can wait until an amount of time corresponding to the relevant predetermined time interval expires and can send an instruction to the notification module 244 to send a new notification to the device 202. In some examples, subsequent predetermined time intervals can be associated with a same length of time as immediately prior predetermine time intervals. In other examples, subsequent predetermined time intervals can be associated with shorter or longer lengths of time. For instance, in at least one example, subsequent predetermined time intervals can be twice as long as an immediately prior time interval (e.g., exponential backoff). In an alternative example, subsequent predetermined time intervals can be half as long as an immediately prior time interval. In additional and/or alternative examples, subsequent predetermined time intervals can be some other factor (e.g., one-third, three, one-fourth, four, etc. of an immediately prior time interval.

The timer management module 242 and the notification module 244 can track time and/or send notifications until the timer management module 242 receives an indication of a successful registration, or a timeout occurs.

Figure 6:
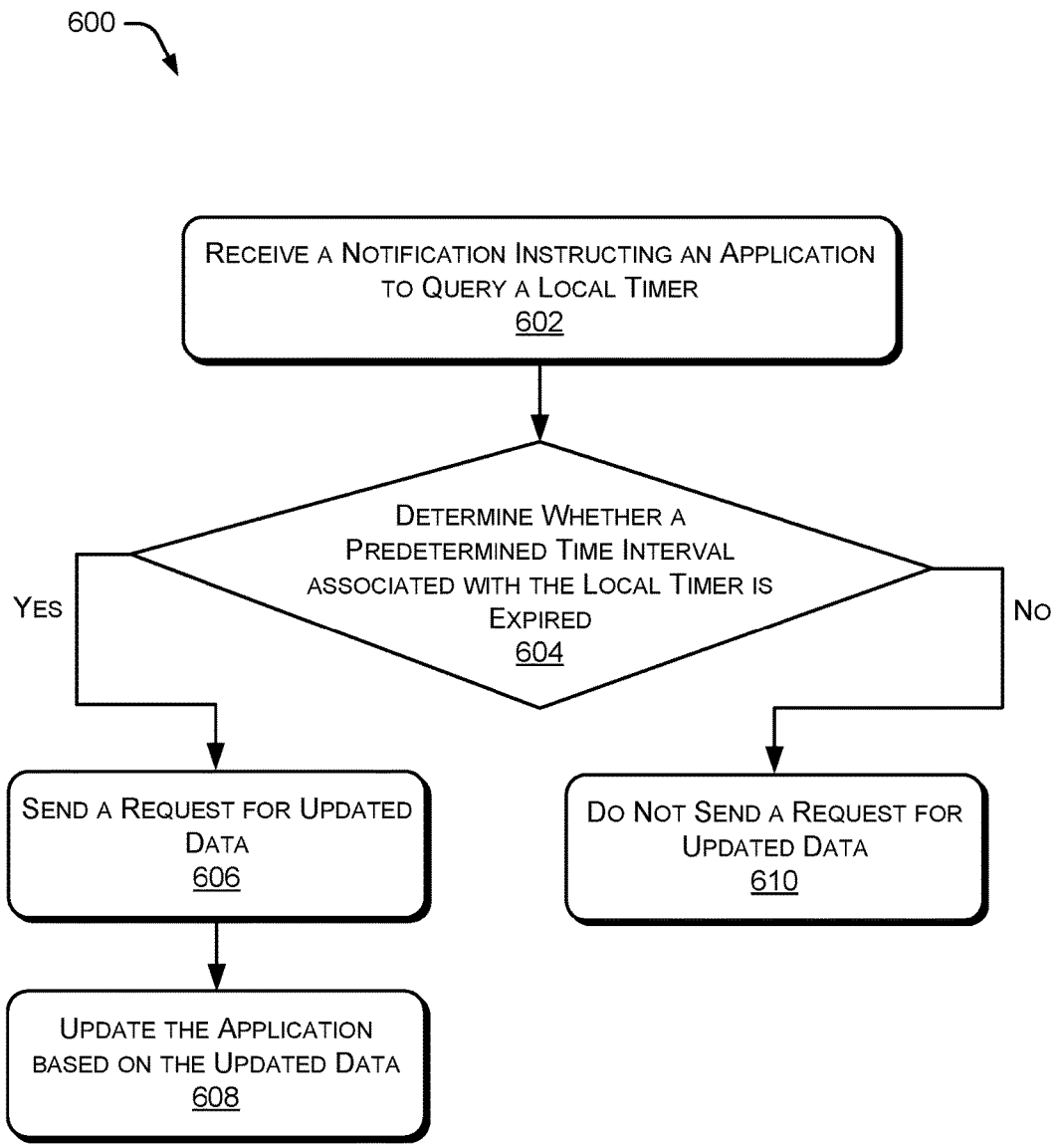
FIG. 6 illustrates an example process for managing local timers via server-managed notifications.

FIG. 6 illustrates an example process 600 for managing local timers via server-managed notifications.

Block 602 illustrates receiving a notification instructing an application to query a local timer. In at least one example, the update module 230 can receive a notification from the notification module 244 that can instruct the update module 230 to query the local timer(s) 232 to determine whether any of the local timer(s) 232 have expired (e.g., a corresponding predetermined time interval has lapsed).

Block 604 illustrates determining whether a predetermined time interval associated with the local timer is expired. In at least one example, the update module 230 can query the local timer(s) 232 to determine whether any of the local timer(s) 232 have expired. That is, the update module 230 can query the local timer(s) 232 to determine whether any predetermined time intervals associated with the local timer(s) 232 have lapsed.

Based at least in part on determining that the predetermined time interval is expired, the update module 230 can send a request for updated data, as illustrated in block 606. In at least one example, the update module 230 can send a request for updated data to the server(s) 204.

Block 608 illustrates updating the application based on the updated data. The server(s) 204 can send updated data to the update module 230 and the update module 230 can update the Application A 226A based on the received updated data. For instance, in an example, based on retrieving updated data, the Application A 226A can update a user profile associated with the Application A 226A, update a message inbox with new message(s) intended for the Application A 226A, etc.

Based at least in part on determining that the predetermined time interval is not expired, the update module 230 can refrain from sending a request for updated data, as illustrated in block 610.

In some examples, each timer of the one or more local timers 232 can be associated with a different predetermined time interval. Accordingly, in some examples, a first local timer may have expired but a second local timer may not have expired. In such examples, the update module 230 can send a request for updated data associated with a first local timer but can refrain from sending a request for updated data associated with a second local timer until the second local timer expires.

As described above, in addition to conserving battery life, techniques described herein enable the server(s) 204 to offload data to device(s) (e.g., device 202) more frequently than with current techniques. Accordingly, techniques described herein are directed to reducing the amount of storage required by the server(s) 204. For instance, the update module 230 can retrieve updated data from the server(s) 204 and can store the data on the device 202 instead of the server(s) 204, thereby reducing the amount of storage required by the server(s) 204.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
an application associated with a device, the application comprising first computer-readable instructions executable to:
send a first request to register with a service provider to one or more servers associated with the service provider;
receive, from the one or more servers, a first response to the first request, the first response indicating whether the first request to register with the service provider succeeded;
send a first indication to the one or more servers indicating whether the first request to register with the service provider succeeded;
the one or more servers of the service provider, comprising:
one or more processors;
one or more second computer-readable instructions executable by the one or more processors to:
receive the first request from the device;
send the first response to the device;
receive the first indication from the device;
start, based at least in part on the first indication, a first timer associated with a first predetermined time interval after which the one or more servers are to send a first notification to the application;
determine, based at least in part on the first timer, a lapse of the first predetermined time interval; and
send the first notification to the application, the first notification instructing the application to send a second request to register with the service provider.

2. The system of claim 1, wherein the first response indicates that the first request succeeded and the second computer-readable instructions are further executable by the one or more processors to:
start, based at least in part on the first indication, a second timer, the second timer associated with a second predetermined time interval after which the one or more servers are to send a second notification to the application;
determine, based at least in part on the second timer, a lapse of the second predetermined time interval; and
send the second notification to the application, the second notification instructing the application to query a local timer.

3. The system of claim 2, the first computer-readable instructions further executable to:
query, based at least in part on the second notification, the local timer;
determine a lapse of a third predetermined time interval associated with the local timer; and
retrieve updated data associated with the application.

4. The system of claim 2, wherein a length of the first predetermined time interval is greater than a length of the second predetermined time interval.

5. The system of claim 1, wherein the first response indicates that the first request failed and includes an error code indicating a reason that the first request failed.

6. The system of claim 5, wherein the second computer-readable instructions are further executable by the one or more processors to:
    receive, from the device, a second indication indicating that the second request to register with the service provider failed;
    determine, based at least in part on the first timer, a lapse of a second predetermined time interval, a length of the second predetermined time interval based at least in part on the error code; and
    send a second notification to the application, the second notification instructing the application to send a third request to register with the service provider.

7. The system of claim 6, wherein:
    the second computer-readable instructions are further executable by the one or more processors to send subsequent notifications to the application until a subsequent request to register is successful or a timeout occurs;
    each subsequent notification is sent after a lapse in a subsequent predetermined time interval;
    a length of the second predetermined time interval is shorter than a length of the first predetermined time interval; and
    each subsequent predetermined time interval is twice as long as an immediately prior predetermined time interval.

8. The system of claim 1, the first computer-readable instructions further executable to:
    cause the application to enter an inactive state based at least in part on sending the first indication to the one or more servers; and
    cause the application to enter an active state based at least in part on receiving the first notification.

9. A computer-implemented method performed by one or more servers of a service provider, the computer-implemented method comprising:
    receiving a first indication from an application associated with a device, the first indication identifying a response to a registration request sent by the application for registration with the service provider;
    starting, based at least in part on the first indication, a first timer associated with a first predetermined time interval after which the one or more servers are to send a first notification to the application;
    determining, based at least in part on the first timer, a lapse of the first predetermined time interval; and
    sending the first notification to the application, the first notification instructing the application to send a new registration request to register with the service provider.

10. The computer-implemented method of claim 9, wherein the response to the registration request comprises a success response, a terminal error response, or a non-terminal error response.

11. The computer-implemented method of claim 10, wherein the first timer is one of a plurality of timers and the computer-implemented method further comprises selecting the first timer instead of other timers of the plurality of timers based at least in part on the response to the registration request.

12. The computer-implemented method of claim 11, wherein individual timers of the plurality of timers are associated with individual predetermined time intervals, lengths of the individual predetermined time intervals being configurable.

13. The computer-implemented method of claim 10, wherein the response to the registration request indicates that the registration request succeeded and the computer-implemented method further comprises:
    starting, based at least in part on the new registration request, a second timer that is associated with a second predetermined time interval after which the one or more servers are to send a second notification to the application;
    determine, based at least in part on the second timer, a lapse of the second predetermined time interval; and
    send the second notification to the application, the second notification instructing the application to query a local timer.

14. The computer-implemented method of claim 13, wherein a length of the first predetermined time interval is longer than a length of the second predetermined time interval.

15. The computer-implemented method of claim 9, further comprising:
    receiving, from the device, a second indication that the new registration request to register with the service provider failed;
    determine, based at least in part on the first timer, a lapse of a second predetermined time interval; and
    send a second notification to the application, the second notification instructing the application to send another registration request to register with the service provider.

16. The computer-implemented method of claim 15, wherein:
    the response to the registration request sent by the application is associated with a non-terminal error;
    the computer-implemented method further comprises sending subsequent notifications to the application until a subsequent request to register is successful or a timeout occurs;
    each subsequent notification is sent after a lapse in a subsequent predetermined time interval;
    a length of the second predetermined time interval is shorter than a length of the first predetermined time interval; and
    a length of each subsequent predetermined time interval is twice as long as an immediately prior predetermined time interval.

17. The computer-implemented method of claim 15, wherein the response to the registration request sent by the application is associated with a terminal error and a length of the second predetermined time interval is shorter than a length of the first predetermined time interval.

18. A computer-implemented method performed by an application associated with a device, the computer-implemented method comprising:
    sending, to one or more servers associated with a service provider, a first request to register with the service provider;
    receiving, from the one or more servers, a first response to the first request, the first response indicating whether the first request to register with the service provider succeeded;
    sending, to the one or more servers, a first indication indicating whether the first request to register with the service provider succeeded;
    causing the application to enter an inactive state based at least in part on sending the first indication to the one or more servers; and receiving, after a lapse of a first predetermined time interval and from the one or more servers, a notification instructing the application to send a second request to re-register with the service provider.

19. The computer-implemented method of claim 18, further comprising:
   causing the application to enter an active state based on receiving the notification;
   sending, to one or more servers associated with the service provider, the second request to register with the service provider;
   receiving, from the one or more servers, a second response to the second request, the second response indicating whether the second request to register with the service provider succeeded; and
   sending, to the one or more servers, a second indication indicating whether the second request to register with the service provider succeeded.

20. The computer-implemented method of claim 18, wherein the first response indicates that the first request succeeded, and the computer-implemented method further comprises:
   receiving, after a lapse of a second predetermined time interval and from the one or more servers, a second notification instructing the application to query a local timer;
   querying, based at least in part on the second notification, the local timer;
   determining a lapse of a third predetermined time interval associated with the local timer; and
   sending a third request for updated data associated with the application.

* * * * *